3,664,767
PUMPING APPARATUS
Erwin Kolfertz, Bebelallee 9, Solingen-
Merscheid, Germany
Filed Sept. 3, 1970, Ser. No. 69,388
Claims priority, application Germany, Dec. 5, 1969,
G 69 47 175.6; May 12, 1970, P 20 23 516.9
Int. Cl. F04b 49/06, 35/04, 17/04; H02k 33/00, 35/00
U.S. Cl. 417—45
7 Claims

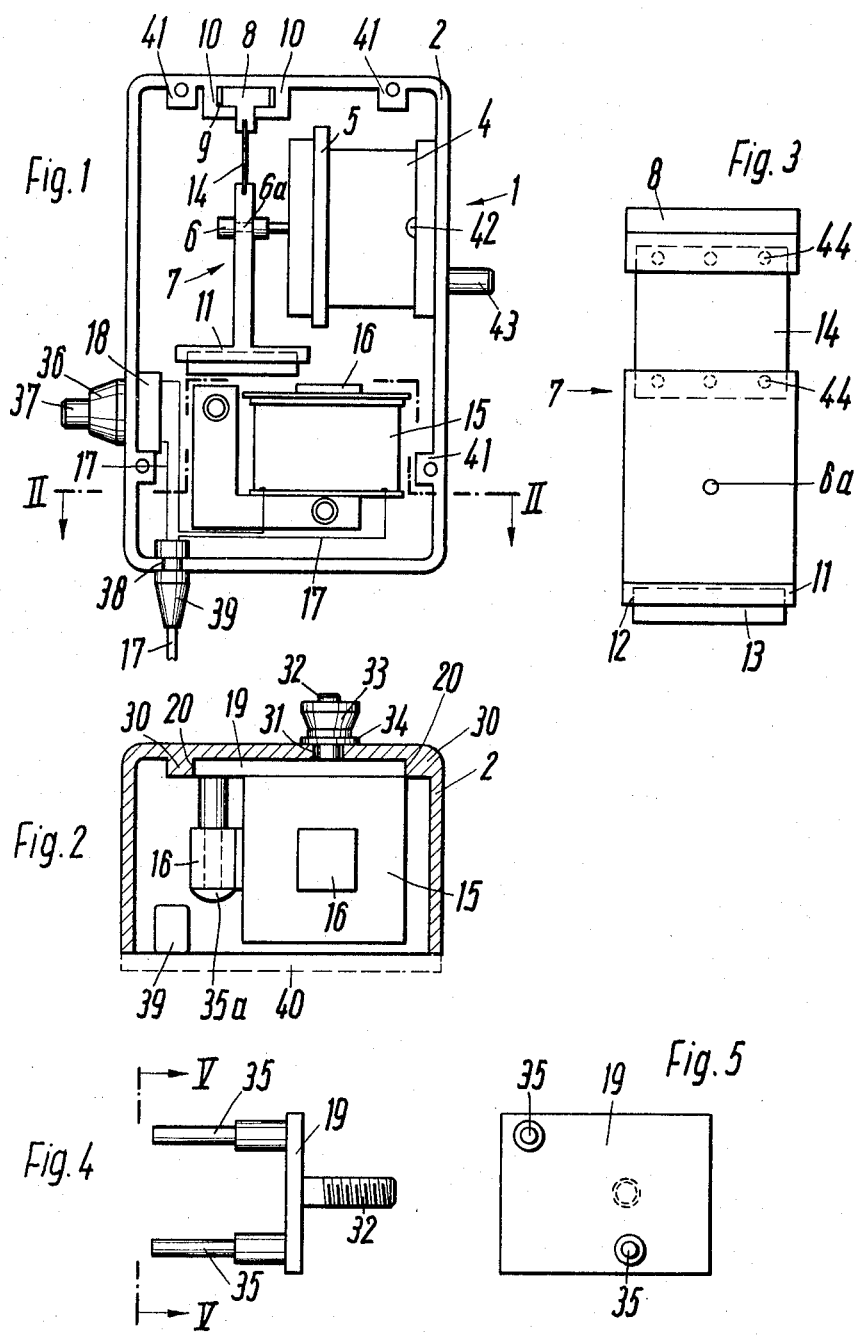

ABSTRACT OF THE DISCLOSURE

Pumping apparatus incorporating a diaphragm pump driven by an A.C. oscillating armature motor. The electromagnetic coil of the motor is mounted on a plate which is slideable to allow adjustment of the air gap between the coil and the armature to provide adjustment in the pumping rate.

The invention relates to a pumping apparatus, with a pump, such as a diaphragm pump, driven by an A.C. oscillating armature motor. The pump and the motor may be contained in a common housing.

A.C. oscillating armature motors usually consist of an electromagnetic coil and an oscillating armature which oscillates in the magnetic field created by the coil. For driving a pump the oscillating armature is connected to a mobile part of the pump, particularly to the diaphragm of a diaphragm pump. The oscillating armature is either in the form of an electric conductor which reacts with the magnetic field of the coil, or a magnet which responds to the oscillating magnetic field.

Pump drives in the form of A.C. oscillating armature motors have proved particularly satisfactory for driving pumps which are used for aerating aquaria, and for driving the pumps used in medical apparatus, for example in instruments for measuring blood pressure.

A pump of this kind should have some means for adjusting the pump output. For example in the aerating of aquaria the air injected into the water must not create such a copious flow of bubbles that the aquatic plants are endangered. The output of the pump can be adjusted by means of a valve in the pump delivery pipe, or by adjusting the electric voltage applied to the A.C. oscillating armature motor. Both these methods require the provision of auxiliary apparatus and this is hardly tolerable, in the case of an A.C. oscillating armature motor, for reasons of cost.

The object of the present invention is to provide a pump drive which allows the pump output to be adjusted in a simple and inexpensive manner.

This problem is solved in that, according to the invention, the electromagnetic coil of the A.C. oscillating armature motor is mounted on a plate which is slidable relatively to the armature of the motor to allow adjustment of the air gap between the coil and the armature. This allows the output of the pump, which is preferably a diaphragm pump to be adjusted by adjusting the air gap between the coil and the armature, that is to say by adjusting the intensity of the magnetic field.

For easy manipulation the pump output should be adjustable from outside a common housing if such housing contains both the pump and motor.

The arrangement for adjusting the air gap width provides the further advantage that it makes assembly of the parts easier during manufacture. The coil is often obtained from an outside manufacturer and if the coils are obtained from different manufacturers they can vary considerably in their properties. This often makes it necessary to adjust the air gap. This adjustment can be achieved in an apparatus according to the invention. The mounting plate can be made of a heat insulating material which protects the housing from the heat generated by the coil. This allows the housing to be made of a less expensive raw material, because it does not become so hot when the pump is operating. If the housing becomes too hot it tends to deform out of shape in the course of time.

Furthermore the mounting plate can be made of an electrically insulating material and this allows a metal housing to be used, if desired, without it being necessary to earth the housing electrically.

The housing may have at least one guide slot extending parallel to the direction of slide of the mounting plate, the plate being securable in position by means of a screw threaded pin extending through the slot. To adjust the position of the mounting plate, in order to change the air gap, it is merely necessary to loosen the pin or a nut on the pin from outside the housing, adjust the mounting plate in position, and then tighten up the pin or nut again.

The mounting plate preferably consists of a plate guided by rails which are preferably formed integrally with the housing. This makes it unnecessary to provide any special attachments on the housing cover, and also simplifies the mounting of the coil.

An example of an apparatus constructed in accordance with the invention is illustrated in the accompanying drawings, in which:

FIG. 1 is an elevation;
FIG. 2 is a section taken on the line II—II in FIG. 1;
FIG. 3 is a side elevation to a larger scale, of the oscillating armature of the motor;
FIG. 4 shows the adjustable mounting plate for supporting the coil; and
FIG. 5 is a front elevation as seen looking in the direction V—V in FIG. 4.

FIG. 1 shows a diaphragm pump 1 installed in a housing 2, which is made of a synthetic plastics material. The diaphragm pump 1 consists of a pump chamber 4 and a rubber diaphragm 5, from the middle of which there projects an actuating pin 6 which penetrates through a drilling 6a in an oscillating armature 7, the pin 6 being secured to the armature.

The oscillating armature 7 is in two parts, joined together by a plate spring 14. The lower part of the armature has a flange 11, giving this part of the armature an inverted T shape in cross section. The upper part of the armature is also T shaped, having an upper flange 8. The upper part of the armature is secured to the wall of the housing 2 by two rails 10. The flange 11 of the lower part of the armature has a recess 12, as shown in FIG. 3, which contains a permanent magnet 13. The two parts of the armature are made of a synthetic plastics material and each armature part is secured to the intermediate spring plate 14 by hot pressing, the plastics substance penetrating into drillings 44 in the steel plate spring 14, locking the parts permanently together. When the pump is in operation the lower part of the armature oscillates from side to side, the steel plate spring 14 flexing to allow this movement.

The oscillating movement of the lower part of the armature 7 is powered by an electromagnetic coil 15 which has a U-shaped laminated iron core 16. The laminated core 16 is positioned somewhat to one side with respect to the permanent magnet 13 of the oscillating armature. The coil 15 is supplied with current from an A.C. current source, which is not shown in the drawing. The current is supplied to the coil over an electric lead 17 and over a pushbutton switch 18, which allows the pump to be switched on and switched off.

The coil 15, together with its iron core 16, is mounted in the housing 2 by means of a rectangular mounting plate 19, which is adjustable in position vertically for adjusting the width of the magnetic air gap between the magnet core 16 and the permanent magnet 13 of the oscillating armature. The mounting plate 19 is installed in a guide recess 20 formed in the wall 2 of the housing, the mounting plate 19 being adjustable in position vertically by sliding it up and down in the guide recess 20, the plate being guided in this adjustment movement by two guide rails 30 which are formed as part of the housing 2. From the back of the mounting plate 19 a threaded pin 32 projects outwards through a vertical slot 31 in the wall 2 of the housing; a knurled locking nut 33 screws on the threaded pin 32 to lock the mounting plate 19 in position, a washer 34 being interposed between the knurled nut 33 and the wall 2 of the housing. To adjust the laminated iron core 16, with its electromagnetic coil 15, in position vertically, for adjusting the width of the air gap, it is merely necessary to loosen the knurled nut 33 and push the threaded pin 32 up or down in the vertical slot 31 until the width of the gap has been adjusted as desired, finally tightening the locking nut 33.

The washer 34 prevents the knurled nut 33 from working loose, and also reduces the stress applied to the material of the housing, the washer 34 preventing damage to the housing if the knurled nut 33 is tightened excessively.

Adjusting the gap width between the laminated core 16 and the permanent magnet 13 of the oscillating armature changes the intensity of the oscillating magnetic field in the gap and so changes the amplitude of oscillation of the armature and the rate of delivery of air from the pump. Thus the output of the diaphragm pump is adjustable steplessly by adjusting the vertical position of the threaded pin 32 in the slot 31.

As shown in FIG. 4, the mounting plate 19 has two projecting studs 35 which serve for supporting the U-shaped laminated iron core 16, the electromagnetic coil 15 being mounted on the one arm of the iron core 16 and retained in place by ribs projecting outwards from the outer surfaces of the two outer laminations of the iron core.

The mounting plate 19 is made of a heat insulating plastic material, so that the plate acts as a heat insulator between the coil 15 and the wall 2 of the housing. This allows a considerably less costly plastics material to be used for the housing, because it does not become so hot.

The mounting plate 19, with its three projecting pins 32, 35 is made in one piece as a plastic injection moulding. The iron core 16 has two drillings going all the way through the laminations, for receiving the supporting studs 35. To lock the iron core in place the ends of the studs 35 are riveted over, as shown in FIG. 2.

The fact that the mounting plate 19 is made of an electric insulator, in the form of a synthetic plastics material, has the advantage that the housing 2 can if desired be of metal, for certain applications, in which case the metal housing need not be electrically earthed.

The pushbutton switch 37, for switching the pump on and off, is introduced through a drilling in the housing wall 2 and secured by a knurled nut 36, which screws over the guide sleeve of the pushbutton 37, the knurled nut 36 being finally secured against inadvertent rotation.

At the bottom the housing 2 has a slot 38 for retaining the rubber or soft PVC end 39 of the electric supply cable 17, the end joint 39 being arranged to make a secure joint between the cable and the housing, preventing the cable 17 from being pulled out inadvertently.

The back of the housing 2 is closed by a cover plate 40, as shown in FIG. 2, so that all the internal parts of the assembly are well protected from external influences. The cover plate 40 can for example be screwed to the housing 2 at the inward projecting ribs 41, shown in FIG. 1.

For aerating an aquarium, the assembly is mounted above the aquarium. When the pump is switched on ambient air is sucked in through the inlet opening 42 and expelled through the outlet connection 43 into the water in the aquarium. The output of the pump is then adjusted, on the basis of visual observation of the rising bubbles, by loosening the knurled nut 33 and shifting the threaded pin 32 up or down in the slot 31, until the air bubbles appear in the water at the desired rate. Finally the knurled nut 33 is tightened to lock the mounting plate 19 in place. Once adjusted the pump continues to deliver air at a constant rate.

I claim:

1. In pumping apparatus comprising a pump, an A.C. oscillating armature motor which incorporates an oscillating armature and a coil, and means coupling said pump to said oscillating armature to drive said pump, the improvement which comprises a mounting plate supporting said coil and means slidably supporting said mounting plate relatively to said armature to allow adjustment of the air gap between said coil and said armature, a common housing within which the pump and motor are mounted, and means for adjusting the mounting plate and thus said air gap externally of said housing.

2. Apparatus according to claim 1, wherein said mounting plate is made of a heat insulating material.

3. Apparatus according to claim 1, wherein said mounting plate is made of an electrically insulating material and said housing is made of metal and not electrically earthed.

4. Apparatus according to claim 1, wherein said mounting plate has projecting pins for supporting said coil.

5. In pumping apparatus comprising a pump, an A.C. oscillating armature motor which incorporates an oscillating armature and a coil, the pump and motor being mounted in a common housing, and means coupling said pump to said oscillating armature to drive said pump, the improvement which comprises a mounting plate supporting said coil and means slidably supporting said mounting plate relatively to said armature to allow adjustment of the air gap between said coil and said armature, said housing having at least one guide slot extending parallel to the direction of slide of said mounting plate, said plate being securable in position by means of a screw threaded pin extending through said slot.

6. Apparatus according to claim 5, wherein said housing has guide rails for guiding said mounting plate during its sliding adjustment.

7. Apparatus according to claim 6, wherein said guide rails are formed integrally with said housing.

References Cited

UNITED STATES PATENTS

| | | | |
|---|---|---|---|
| 3,255,956 | 6/1966 | Beck et al. | 310—36 X |
| 3,266,716 | 8/1966 | Tussey | 310—36 X |

ROBERT M. WALKER, Primary Examiner

U.S. Cl. X.R.

310—36; 417—416